(12) United States Patent
Harper

(10) Patent No.: US 8,972,623 B2
(45) Date of Patent: Mar. 3, 2015

(54) EFFICIENT COMPLEX NETWORK TRAFFIC MANAGEMENT IN A NON-UNIFORM MEMORY SYSTEM

(71) Applicant: John Anthony Harper, Mountain View, CA (US)

(72) Inventor: John Anthony Harper, Mountain View, CA (US)

(73) Assignee: Netronome Systems, Incorporated, Santa Clara, CA (US)

( * ) Notice: Subject to any disclaimer, the term of this patent is extended or adjusted under 35 U.S.C. 154(b) by 79 days.

(21) Appl. No.: 13/875,968

(22) Filed: May 2, 2013

(65) Prior Publication Data

US 2014/0330991 A1 Nov. 6, 2014

(51) Int. Cl.
*G06F 9/455* (2006.01)

(52) U.S. Cl.
USPC .......... 710/18; 710/15; 710/16; 710/17; 710/19; 370/239; 370/230

(58) Field of Classification Search
USPC .............. 710/15–19; 370/239, 230
See application file for complete search history.

(56) References Cited

U.S. PATENT DOCUMENTS

| 7,444,473 | B1* | 10/2008 | Koster et al. | 711/119 |
| 8,073,988 | B2* | 12/2011 | Honda | 710/12 |
| 8,077,602 | B2* | 12/2011 | Arimilli et al. | 370/217 |
| 8,593,970 | B2* | 11/2013 | Godbole et al. | 370/239 |

* cited by examiner

*Primary Examiner* — Tammara Peyton
(74) *Attorney, Agent, or Firm* — Imperium Patent Works; T. Lester Wallace; Mark D. Marrello

(57) ABSTRACT

A network appliance includes a first processor, a second processor, a first storage device, and a second storage device. A first status information is stored in the first storage device. The first processor is coupled to the first storage device. A queue of data is stored in the second storage device. The first status information indicates if traffic data stored in the queue of data is permitted to be transmitted. The second processor is coupled to the second storage device. The first processor communicates with the second processor. The traffic data includes packet information. The first storage device is a high speed memory only accessible to the first processor. The second storage device is a high capacity memory accessible to multiple processors. The first status information is a permitted bit that indicates if the traffic data within the queue of data is permitted to be transmitted.

13 Claims, 22 Drawing Sheets

NETWORK PROCESSOR ORGANIZATION

CLASSIC NETWORK TRAFFIC MANAGEMENT SYSTEM

COMMAND-PUSH-PULL (CPP) DATA BUS
STRUCTURE

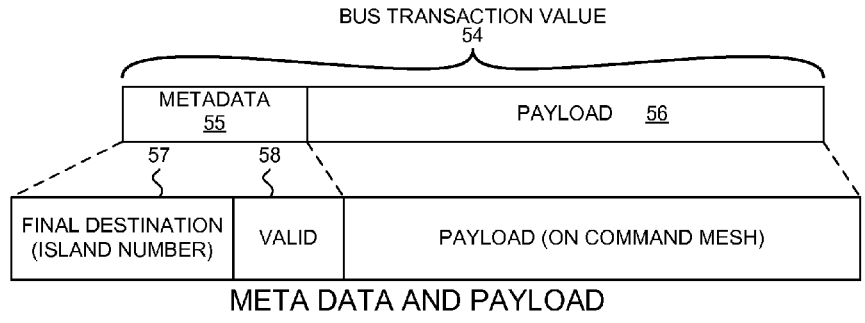

META DATA AND PAYLOAD

FIG. 4

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 5

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 6

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 7

| FIELD | WIDTH | DESCRIPTION |
|---|---|---|
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 8

| FIELD | WIDTH | DESCRIPTION |
|---|---|---|
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 9

MU ISLAND

ROUTER

NETWORK PROCESSOR ORGANIZATION

MULTI-PROCESSOR TRAFFIC MANAGEMENT SOLUTION

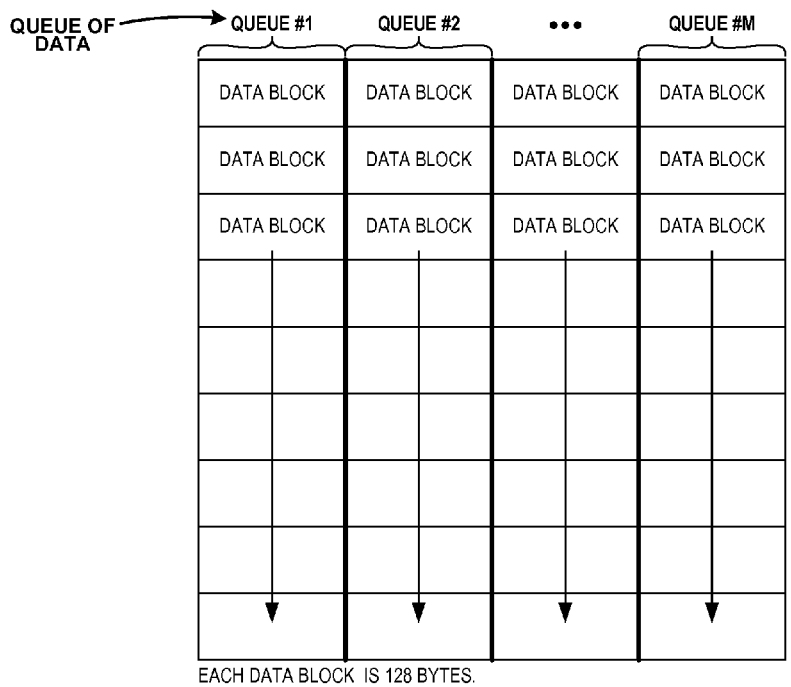

EACH DATA BLOCK IS 128 BYTES.
EACH QUEUE MAY INCLUDE A DIFFERENT NUMBER OF DATA BLOCKS.

INTERNAL ARRAY OF QUEUES

FIG. 15

| FIELD | WIDTH (BYTES) | DESCRIPTION |
|---|---|---|
| QUEUE HEAD | 4 | POINTER TO PREVIOUS DATA BLOCK IN THE QUEUE |
| QUEUE TAIL | 4 | POINTER TO THE NEXT DATA BLOCK IN THE QUEUE |
| QUEUE SIZE | 4 | TOTAL NUMBER OF BYTES OF ALL DATA BLOCKS IN THE QUEUE |
| QUOTA | 4 | TRANSMISSION CREDIT (NEGATIVE VALUE IF IN DEFICIT) |
| WEIGHT | 2 | RELATIVE RATE OF DATA TO BE SENT |
| ADDITIONAL INFO. | X | E.G. QUEUE STRUCTURING INFORMATION, STATISTICAL COUNTERS... |
| TRAFFIC DATA | X | E.G. PACKET INFORMATION SUCH AS PAYLOAD AND HEADER INFORMATION |

DATA BLOCK IS 128 BYTES IN ONE EXAMPLE

DATA BLOCK CONTENTS

FIG. 16

| FIELD | WIDTH (BITS) | DESCRIPTION |
|---|---|---|
| ACTIVE | 1 | INDICATES IF THE ASSOCIATED DATA BLOCK IS OCCUPIED (1) OR EMPTY (0). |
| PERMITTED | 1 | INDICATES IF THE ASSOCIATED DATA BLOCK IS PERMITTED TO TRANSMIT (1), OR NOT PERMITTED TO TRANSMIT (0). |

STATUS INFORMATION DATA

INTER-PROCESS CONTROL MESSAGE STRUCTURE

| ACTIVE BIT (QUEUE #1) | ACTIVE BIT (QUEUE #2) | ACTIVE BIT (QUEUE #3) | ACTIVE BIT (QUEUE #4) |
|---|---|---|---|
| ACTIVE BIT (QUEUE #5) | ACTIVE BIT (QUEUE #6) | ACTIVE BIT (QUEUE #7) | ACTIVE BIT (QUEUE #8) |
| ACTIVE BIT (QUEUE #9) | ACTIVE BIT (QUEUE #10) | ACTIVE BIT (QUEUE #11) | ACTIVE BIT (QUEUE #12) |
| | | | |
| | | | |
| | | | |
| | | | |
| ACTIVE BIT (QUEUE #M-3) | ACTIVE BIT (QUEUE #M-2) | ACTIVE BIT (QUEUE #M-1) | ACTIVE BIT (QUEUE #M) |

- ONE ACTIVE BIT PER QUEUE OF DATA.
- ACTIVE BIT INDICATES IF THE ASSOCIATED QUEUE OF DATA HAS AN OCCUPIED DATA BLOCK.

CONTENTS OF DATA MEMORY ASSOCIATED WITH SINGLE PROCESSOR (E.G. ME) PERFORMING SCHEDULER PROCESS

FIG. 19

| PERMITTED BIT (QUEUE #1) | PERMITTED BIT (QUEUE #2) | PERMITTED BIT (QUEUE #3) | PERMITTED BIT (QUEUE #4) |
|---|---|---|---|
| PERMITTED BIT (QUEUE #5) | PERMITTED BIT (QUEUE #6) | PERMITTED BIT (QUEUE #7) | PERMITTED BIT (QUEUE #8) |
| PERMITTED BIT (QUEUE #9) | PERMITTED BIT (QUEUE #10) | PERMITTED BIT (QUEUE #11) | PERMITTED BIT (QUEUE #12) |
| | | | |
| | | | |
| | | | |
| | | | |
| | | | |
| PERMITTED BIT (QUEUE #N-3) | PERMITTED BIT (QUEUE #N-2) | PERMITTED BIT (QUEUE #N-1) | PERMITTED BIT (QUEUE #N) |

- ONE PERMITTED BIT PER QUEUE OF DATA.
- PERMITTED BIT INDICATES IF THE ASSOCIATED QUEUE OF DATA IS PERMITTED TO TRANSMIT.

CONTENTS OF DATA MEMORY DEDICATED TO ME RUNNING DISPATCH PROCESS

FIG. 20

QUEUE STATE DIAGRAM

INGRESS PROCESS FLOW

DISPATCH PROCESS FLOW

EGRESS PROCESS FLOW

FAST BIT SET LOOKUP

FLOWCHART OF DATA TRANSMISSION MANAGEMENT

EFFICIENT COMPLEX NETWORK TRAFFIC MANAGEMENT IN A NON-UNIFORM MEMORY SYSTEM

TECHNICAL FIELD

The described embodiments relate generally to managing network traffic and more specifically to managing complex network traffic in a non-uniform memory system.

BACKGROUND INFORMATION

A network processor is a device that executes programs to handle packet traffic in a data network. A network processor is also often referred to as a network flow processor or simply a flow processor. Examples include network processor integrated circuits on router line cards and in other network equipment. In one example, a network processor integrated circuit is capable of receiving packets, classifying and performing atomic operations on the packets and associated packet data, and transmitting packets. Processors on the integrated circuit are called upon to perform processing functions that include managing various queues of data to ensure various Quality of Services (QOS) to various network clients. A processor on the integrated circuit may also be called upon to determine and to log updated activity and permission information into appropriate tables in memory. As throughput requirements increase, ways of adding processing power are sought.

In one specific example, a network processor integrated circuit uses the flexible and expandable IXP2800 architecture. The IXP2800 architecture allows multiple high-speed processors (referred to as microengines) to access the same memory resources via a common command/push/pull bus. Due to use of the IXP2800 architecture and multiple microengines, increased processing power is brought to bear on the tasks of identifying data structures using hash functions and of logging packet and byte count information. If more throughput is required, then more microengines can be employed. If less throughput is required, then fewer microengines can be employed. The NFP-3XXX and NFP-6XXX families of network processor integrated circuits available from Netronome Systems, Inc. of Santa Clara, Calif. include a selection of IXP2800-based network processor integrated circuits having different numbers of microengines.

SUMMARY

An Island-Based Network Flow Processor (IB-NFP) includes a plurality of islands that are interconnected by a configurable mesh Command/Push/Pull (CPP) data bus. A first of the islands includes a processor. A second of the islands includes a novel transactional memory. The CPP data bus includes a configurable command mesh, a configurable pull-id mesh, a configurable data0 mesh, and a configurable data1 mesh. The Island-Based Network Flow Processor is utilized to implement an efficient complex network traffic management in a non-uniform memory system.

In a first novel aspect, a network appliance includes a first processor and a first storage device. A first status information is stored in the first storage device, and the first processor is coupled to the first storage device. The network appliance further includes a second processor and a second storage device. A queue of data is stored in the second storage device. The first status information indicates whether traffic data stored in the queue of data is permitted to be transmitted. The second processor is coupled to the second storage device. The first processor communicates with the second processor. The traffic data includes packet information. The first storage device is a high speed memory only accessible to the first processor. The second storage device is a high capacity memory accessible to multiple processors. The first status information is a permitted bit that indicates if the traffic data within the queue of data is permitted to be transmitted. The second processor causes the traffic data to be transmitted in response to receiving a control message from the first processor. The traffic data is transmitted to a desired network location. The first processor fetches and executes instructions stored in a code memory associated only with the first processor. The first and second processors are identical and are collocated on a single processor island.

In a second novel aspect, a network appliance includes a first processor and a first storage device. A first status information is stored in the first storage device, and the first processor is coupled to the first storage device. The network appliance further includes a second processor and a second storage device. A queue of data is stored in the second storage device. The first status information indicates whether traffic data stored in the queue of data is permitted to be transmitted. The second processor is coupled to the second storage device. The first processor communicates with the second processor. The network appliance further includes a third processor and a third storage device. A second status information is stored in the third storage device. The third processor is coupled to the third storage device. The second status information is an active bit that indicates that the queue of data contains an occupied data block. A dispatch process is executing on the first processor and the dispatch process determines that traffic data is permitted to be transmitted and in response sends a control message to the second processor. A scheduler process is executing on the third processor, the scheduler process monitors the activity of the queue of data and determines queue quota value associated with the queue of data, and the schedule process causes the third processor to send a control message to the first processor when the queue quota value is below a threshold value.

In a third novel aspect, traffic data is received by a network appliance. The traffic data is stored in a data block within a queue of data. A first status information associated with the queue of data is read. The first status information is stored on a first storage device. The queue of data is stored on a second storage device. The traffic data is transmitted if the status information associated with the queue of data indicates that the traffic data is permitted to be transmitted. The first status information is updated based upon a second status information associated with the queue of data. The updating is performed by a third processor that communicates with the first and second processors. The second status information is stored in a third storage device.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 is diagram of a bus transaction value communicated across the CPP data bus.

FIG. 5 is a table listing the parts of the command payload of the bus transaction value of FIG. 4, when the bus transaction value is a command sent across the command mesh of the CPP data bus.

FIG. 6 is a table listing the width and description of each field within the payload of a bus transaction value sent across the pull-id mesh of the CPP data bus.

FIG. 7 is a table listing the width and description of each field within the payload of a bus transaction value sent across the data0 or data1 mesh of the CPP data bus.

FIG. 8 is a table listing the width and description of each field within the data payload of a pull transaction.

FIG. 9 is a table listing the width and description of each field within the data payload of a push transaction.

FIG. 15 is a diagram illustrating an internal array of queues.

FIG. 16 is a table describing the contents of a data block.

FIG. 19 is a diagram illustrating the contents of a data memory associated with a single processor performing a scheduler process.

FIG. 20 is a diagram illustrating the contents of a data memory associated with a single processor performing a dispatcher process.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Figure 1:
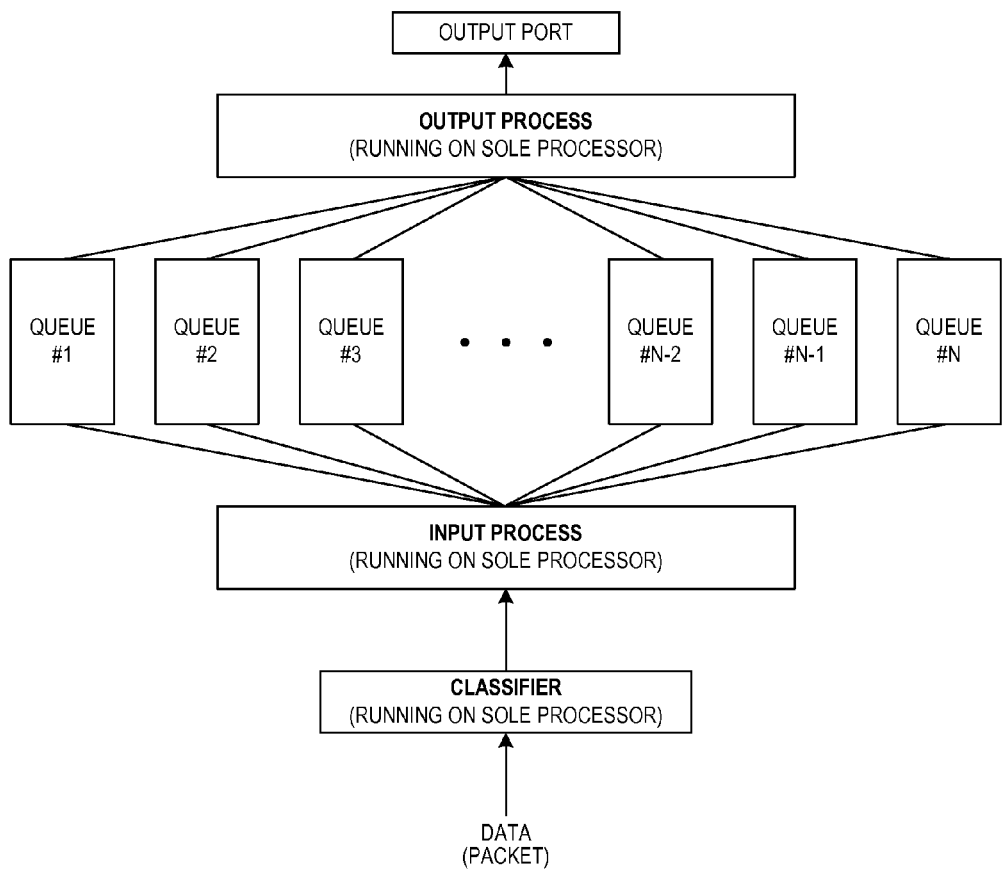
FIG. 1 is a diagram of a classic network traffic management system.

FIG. 1 is a diagram of a classic network traffic management system. Classic network traffic management systems perform traffic management utilizing one processor. The sole process performs the classifier process, the queue input process, and the queue output process. In the classifier process, the sole processor has to read the incoming data (e.g. packet) and determine the class of the incoming data to determine the client sending the data and the Quality of Service (QOS) associated with the client that send the data, etc. In the input process the sole processor has to manage all queues such that none of the queues overflow and allocate incoming data to the appropriate queue based on the QOS associated with the client that sent the incoming data. In the output process, the sole processor has to determine from which queue the next outgoing data is to be selected and perform the read from the selected queue. Finally, in the output process the sole processor has to output the data from the selected queue to the output port. In relatively slow networks, such a traffic management solution may be utilized. However, in high speed networks nearing 100 gigahertz and above, such single processor traffic management solutions are insufficient.

Figure 2:
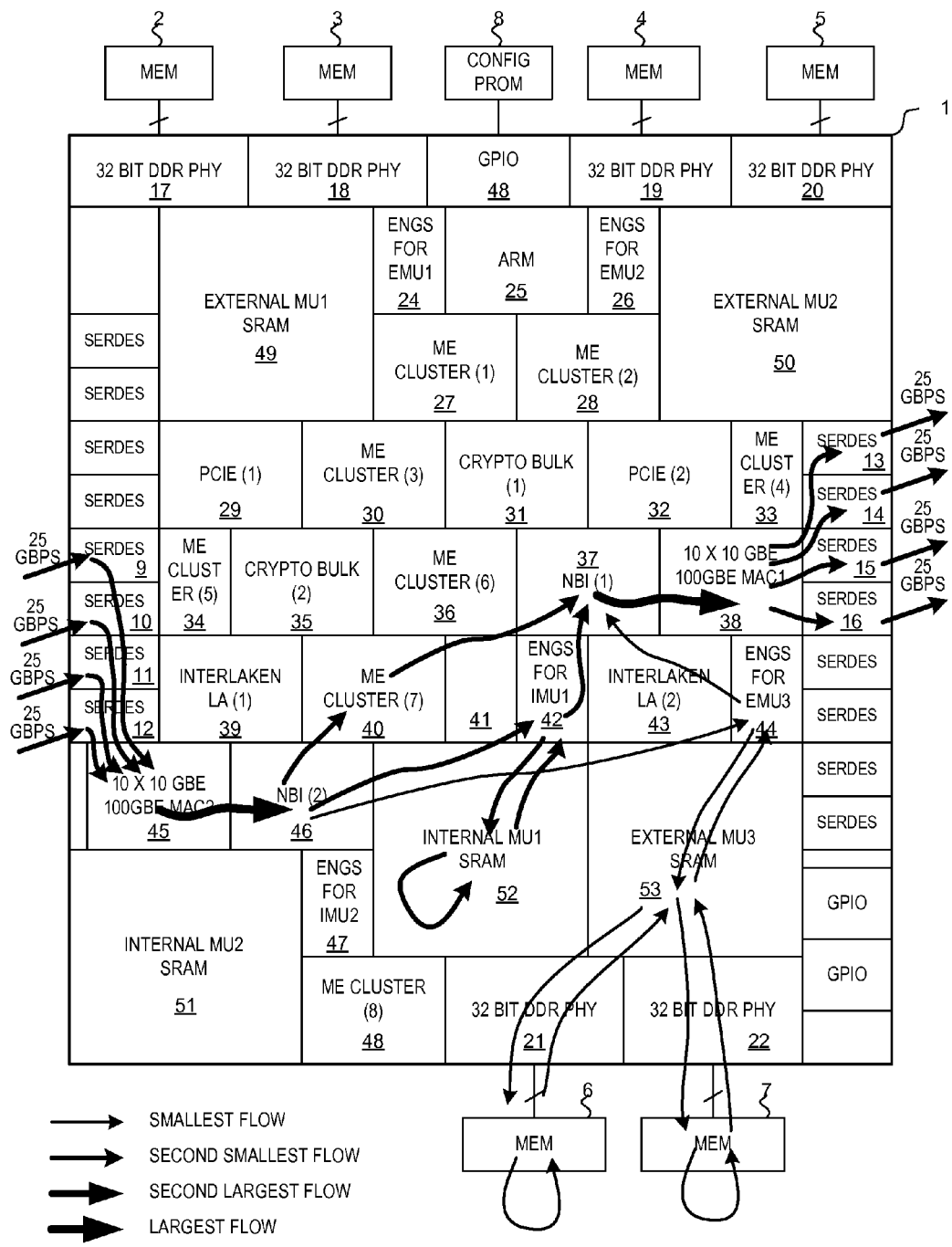
FIG. 2 is a top-down diagram of an Island-Based Network Flow Processor (IB-NFP) integrated circuit 1 and associated memory circuits 2-7.

FIG. 2 is a top-down diagram of an Island-Based Network Flow Processor (IB-NFP) integrated circuit 1 and associated memory circuits 2-7 in an MPLS router application. IB-NFP integrated circuit 1 includes many I/O (input/output) terminals (not shown). Each of these terminals couples to an associated terminal of the integrated circuit package (not shown) that houses the IB-NFP integrated circuit. The integrated circuit terminals may be flip-chip microbumps and are not illustrated. Alternatively, the integrated circuit terminals may be wire bond pads.

SerDes circuits 9-12 are the first set of four SerDes circuits that are used to communicate with an external network via optical cables. A Serializer/Deserializer (SerDes) is a pair of functional blocks commonly used in high speed communications to compensate for limited input/output. These blocks convert data between serial data and parallel interfaces in each direction. The term "SerDes" generically refers to interfaces used in various technologies and applications. SerDes circuits 13-16 are the second set of four SerDes circuits that are used to communicate with a switch fabric (not shown) of the router. Each of these SerDes circuits 13-16 is duplex in that it has a SerDes connection for receiving information and it also has a SerDes connection for transmitting information. Each of these SerDes circuits can communicate packet data in both directions simultaneously at a sustained rate of 25 Gbps. IB-NFP integrated circuit 1 accesses external memory integrated circuits 2-7 via corresponding 32-bit DDR physical interfaces 17-22, respectively. IB-NFP integrated circuit 1 also has several general purpose input/output (GPIO) interfaces. One of these GPIO interfaces 23 is used to access external PROM 8.

In addition to the area of the input/output circuits outlined above, the IB-NFP integrated circuit 1 also includes two additional areas. The first additional area is a tiling area of islands 24-48. Each of the islands is either of a full rectangular shape, or is half the size of the full rectangular shape. For example, the island 29 labeled "PCIE (1)" is a full island. The island 34 below it labeled "ME CLUSTER (5)" is a half island. The functional circuits in the various islands of the tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern.

In addition to this tiling area of islands 24-48, there is a second additional area of larger sized blocks 49-53. The functional circuitry of each of these blocks is not laid out to consist of islands and half-islands in the way that the circuitry of islands 24-48 is laid out. The mesh bus structures do not extend into or over any of these larger blocks. The mesh bus structures do not extend outside of island 24-48. The functional circuitry of a larger sized block may connect by direct dedicated connections to an interface island and through the interface island achieve connectivity to the mesh buses and other islands.

The arrows in FIG. 2 illustrate an operational example of IB-NFP integrated circuit 1 within the MPLS router. 100 Gbps packet traffic is received onto the router via an optical cable (not shown), flows through an optics transceiver (not shown), flows through a PHY integrated circuit (not shown), and is received onto IB-NFP integrated circuit 1, is spread across the four SerDes I/O blocks 9-12. Twelve virtual input ports are provided at this interface. The symbols pass through direct dedicated conductors from the SerDes blocks 9-12 to ingress MAC island 45. Ingress MAC island 45 converts successive symbols delivered by the physical coding layer into packets by mapping symbols to octets, by performing packet framing, and then by buffering the resulting packets for subsequent communication to other processing circuitry. The packets are communicated from MAC island 45 across a private inter-island bus to ingress NBI (Network Bus Interface) island 46. In addition to the optical cable that supplies packet traffic into the IB-NFP integrated circuit from the router, there is another optical cable that communicates packet traffic in the other direction out of the IB-NFP integrated circuit and to the router.

For each packet received onto the IB-BPF in the example of FIG. 2, the functional circuitry of ingress NBI island 46 examines fields in the header portion to determine what storage strategy to use to place the packet into memory. In one example, NBI island 46 examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP. NBI island 46 examines a packet header, performs packet preclassification, determines that the packet is a fast-path packet, and determines that the header portion of the packet should be placed into a CTM (Cluster Target Memory) in ME (Microengine) island 40. The header portion of the packet is therefore communicated across the configurable mesh data bus from NBI island 46 to ME island 40. The CTM is tightly coupled to microengines in the ME island 40. The ME island 40 determines header modification and queuing strategy for the packet based on the packet flow (derived from packet header and contents) and the ME island 40 informs a second NBI island 37 of these. The payload portions of fast-path packets are placed into internal SRAM (Static Random Access Memory) MU block 52 and the payload portions of exception packets are placed into external DRAM 6 and 7.

Half island 42 is an interface island through which all information passing into, and out of, SRAM MU block 52 passes. The functional circuitry within half island 42 serves as the interface and control circuitry for the SRAM within block 52. For simplicity purposes in the discussion below, both half island 42 and MU block 52 may be referred to together as the MU island, although it is to be understood that MU block 52 is actually not an island as the term is used here but rather is a block. The payload portion of the incoming fast-path packet is communicated from NBI island 46, across the configurable mesh data bus to SRAM control island 42, and from control island 42, to the interface circuitry in block 52, and to the internal SRAM circuitry of block 52. The internal SRAM of block 52 stores the payloads so that they can be accessed for flow determination by the ME island.

In addition, a preclassifier in the ingress NBI island 46 determines that the payload portions for others of the packets should be stored in external DRAM 6 and 7. For example, the payload portions for exception packets are stored in external DRAM 6 and 7. Interface island 44, external MU SRAM block 53, and DDR PHY I/O blocks 21 and 22 serve as the interface and control for external DRAM integrated circuits 6 and 7. The payload portions of the exception packets are therefore communicated across the configurable mesh data bus from NBI island 46, to interface and control island 44, to external MU SRAM block 53, to 32-bit DDR PHY I/O blocks 21 and 22, and to external DRAM integrated circuits 6 and 7. At this point in the operational example, the packet header portions and their associated payload portions are stored in different places. The payload portions of fast-path packets are stored in internal SRAM in MU block 52, whereas the payload portions of exception packets are stored in external SRAM in external DRAMs 6 and 7.

ME island 40 informs second NBI island 37 where the packet headers and the packet payloads can be found and provides the second NBI island 37 with an egress packet descriptor for each packet. The egress packet descriptor indicates a queuing strategy to be used on the packet. Second NBI island 37 uses the egress packet descriptor to read the packet headers and any header modification from ME island 40 and to read the packet payloads from either internal SRAM 52 or external DRAMs 6 and 7. Second NBI island 37 places packet descriptors for packets to be output into the correct order. For each packet that is then scheduled to be transmitted, the second NBI island 37 uses the packet descriptor to read the header portion and any header modification and the payload portion and to assemble the packet to be transmitted. The header modification is not actually part of the egress packet descriptor, but rather it is stored with the packet header by the ME when the packet is presented to the NBI. The second NBI island 37 then performs any indicated packet modification on the packet. The resulting modified packet then passes from second NBI island 37 and to egress MAC island 38.

Egress MAC island 38 buffers the packets, and converts them into symbols. The symbols are then delivered by conductors from the MAC island 38 to the four SerDes I/O blocks 13-16. From SerDes I/O blocks 13-16, the 100 Gbps outgoing packet flow passes out of the IB-NFP integrated circuit 1 and to the switch fabric (not shown) of the router. Twelve virtual output ports are provided in the example of FIG. 2.

Figure 3:
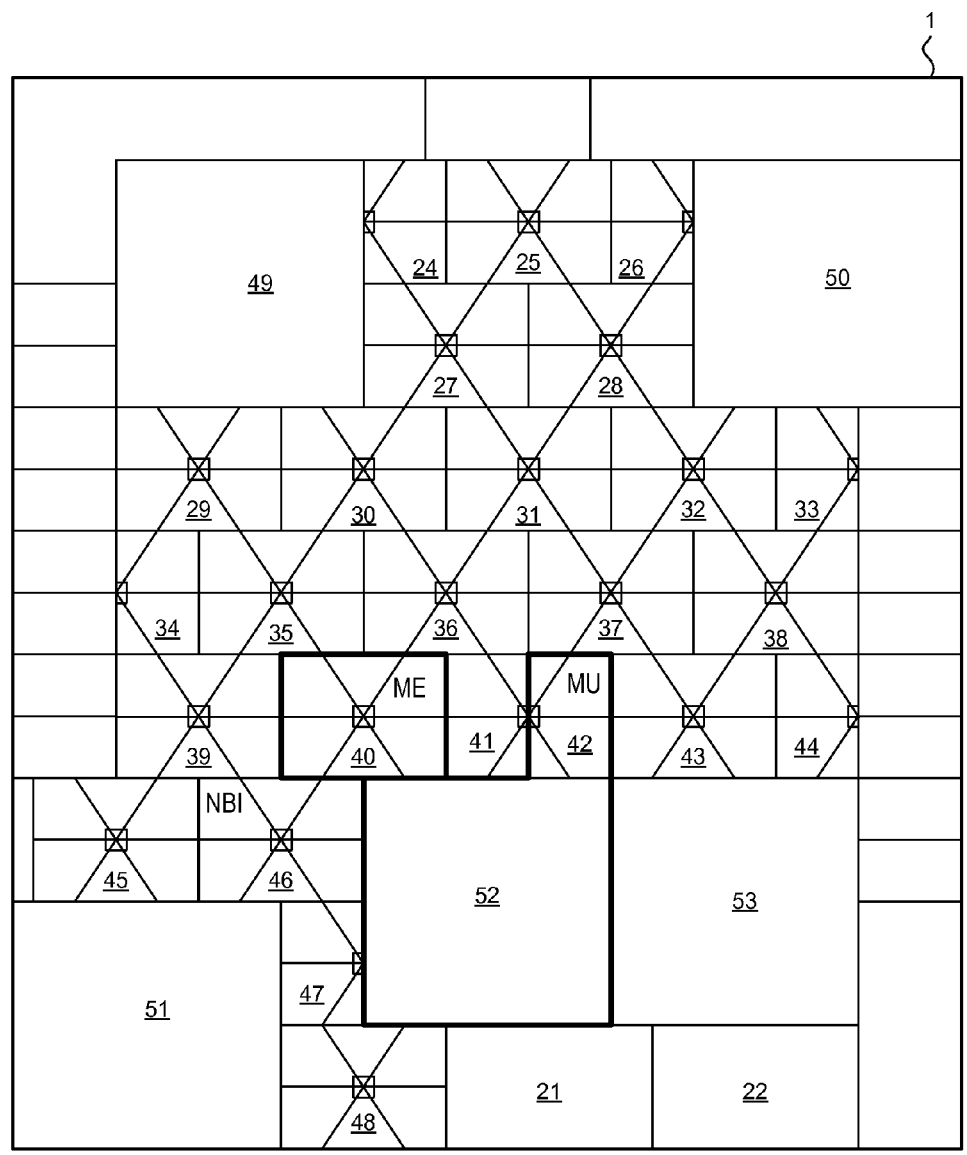
FIG. 3 shows the Command-Push-Pull (CPP) data bus structure that interconnects functional circuitry in the islands of FIG. 2.

General Description of the CPP Data Bus: FIG. 3 shows the Command-Push-Pull (CPP) data bus structure that interconnects functional circuitry in the islands of FIG. 2. Within each full island, the CPP data bus actually includes four mesh bus structures, each of which includes a crossbar switch that is disposed in the center of the island, and each of which includes six half links that extend to port locations at the edges of the island, and each of which also includes two links that extend between the crossbar switch and the functional circuitry of the island. These four mesh bus structures are referred to as the command mesh bus, the pull-id mesh bus, and data0 mesh bus, and the data1 mesh bus. The mesh buses terminate at the edges of the full island such that if another identical full island were laid out to be adjacent, then the half links of the corresponding mesh buses of the two islands would align and couple to one another in an end-to-end collinear fashion to form the staggered pattern illustrated in FIG. 3. For additional information on the IB-NFP, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

General Description of a Write That Results in a Pull: In one example of a CPP bus transaction, a microengine (a master) on ME island 40 uses the data bus interface of ME island 40 to perform a write operation to a hardware engine (a target) on MU half island 42, where the MU island 42 responds by performing a pull operation. To do this, the microengine on the ME island 40 uses the data bus interface to output a bus transaction value onto the command mesh of the CPP data bus. The format of the bus transaction value is as set forth in FIG. 4. A bus transaction value 54 includes a metadata portion 55 and a payload portion 56 as shown. The metadata portion 55 includes a final destination value 57 and a valid bit 58.

The functional circuitry that receives the bus transaction value and the data to be written is referred to as the "target" of the write operation. The write command is said to be "posted" by the master onto the command mesh. As indicated in FIG. 4, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master to the appropriate target, in this case to a hardware engine on MU island 42. All bus transaction values on the command mesh that originate from the same island that have the same final destination value will traverse through the configurable command mesh along the same one path all the way to the indicated final destination island.

A final destination island may include more than one potential target. The 4-bit target field of payload portion indicates which one of these targets in the destination island it is that is the target of the command. In the case of MU island 42, this 4-bit field indicates one of several hardware engines of the MU island 42. The 5-bit action field of the payload portion indicates that the command is a write. The 14-bit data reference field is a reference usable by the master to determine where in the master the data is to be found. The address field indicates an address in the target where the data is to be written. The length field indicates the amount of data.

The target (a hardware engine of MU island 42) receives the write command from the command mesh and examines the payload portion of the write command. From the action field the hardware engine in MU island 42 determines that it is to perform a write action. To carry out this action, the hardware engine (i.e., posts) a bus transaction value called a pull-id onto the pull-id mesh. FIG. 4 shows the format of the overall bus transaction value, and FIG. 6 shows the format of the payload. The final destination field of the metadata portion indicates the island where the master (in this case, a microengine on the ME island 40) is located. The target port field identifies which sub-circuit target it is within the target's island that is the target of the command. In this example, the target island is the MU island 42 so the sub-circuit is a hardware engine on the MU island. The pull-id is communicated through the pull-id mesh back to ME island 40.

The master in the ME island receives the pull-id from the pull-id mesh and uses the content of the data reference field of the pull-id to find the data. In the overall write operation, the master in the ME island knows the data it is trying to write into the MU island. The data reference value that is returned with the pull-id is used by the master in the ME island as a flag to match the returning pull-id with the write operation the ME had previously initiated.

The master on ME island 40 responds by sending the identified data to the target on MU island 42 across one of the data meshes data0 or data1 as a "pull" data bus transaction value. The term "pull" means that the data of the operation passes from the master (a microengine on the ME island) to the target (a hardware engine on the MU island). The term "push" means that the data of the operation passes from the target to the master. The format of the "pull" data bus transaction value sent in this sending of data is also as indicated in FIG. 4. The format of the payload portion in the case of the payload being pull data is as set forth in FIG. 8. The first bit of the payload portion is asserted. This bit being a digital high indicates that the transaction is a data pull as opposed to a data push. The target on MU island 42 then receives the data pull bus transaction value across the data1 or data0 mesh. The data received by the hardware engine as the data for the write is the content of the data field (the data field of FIG. 8) of the pull data payload portion.

FIG. 7 is a generic description of the data payload, and FIG. 8 is a description of the data payload when the first bit of the data payload indicates the data payload is for a pull transaction. FIG. 9 is a description of the data payload when the first bit of the data payload indicates that payload is for a push transaction.

General Description of a Read That Results in a Push: In another example, a master (for example, a microengine on ME island 40) uses the data bus interface of island 40 to perform a read operation from a target (for example, a hardware engine on MU island 42), where the target responds by performing a push operation. The microengine circuitry in ME island 40 uses the data bus interface of island 40 to output (to "post") a bus transaction value onto the command mesh bus of the configurable mesh CPP data bus. In this case, the bus transaction value is a read command to read data from the target hardware engine in MU island 42. The format of the read command is as set forth in FIGS. 4 and 5. The read command includes a metadata portion and a payload portion. The metadata portion includes the 6-bit final destination value that indicates the island where the target is located. The action field of the payload portion of the read command indicates that the command is a read. The 14-bit data reference field is usable by the master as a flag to associate returned data with the original read operation the master previously initiated. The address field in the payload portion indicates an address in the target where the data is to be obtained. The length field indicates the amount of data.

The target (a hardware engine of MU island 42) receives the read command and examines the payload portion of the command. From the action field of the command payload portion the target determines that it is to perform a read action. To carry out this action, the target uses the address field and the length field to obtain the data requested. The target then pushes the obtained data back to the master across data mesh data1 or data0. To push the data, the target outputs a push bus transaction value onto the data1 or data0 mesh. FIG. 4 sets forth the format of the overall push bus transaction value and FIG. 9 sets forth the format of the payload portion of this push bus transaction value. The first bit of the payload portion indicates that the bus transaction value is for a data push, as opposed to a data pull. The master (the microengine of ME island 40) receives the bus transaction value of the data push from the data mesh bus. The master in the ME island then uses the data reference field of the push bus transaction value to associate the incoming data with the original read command, and from the original read command determines where the pushed data (data in the date field of the push bus transaction value) should be written into the master. The master then writes the content of the data field into the master's memory at the appropriate location.

Figure 10:
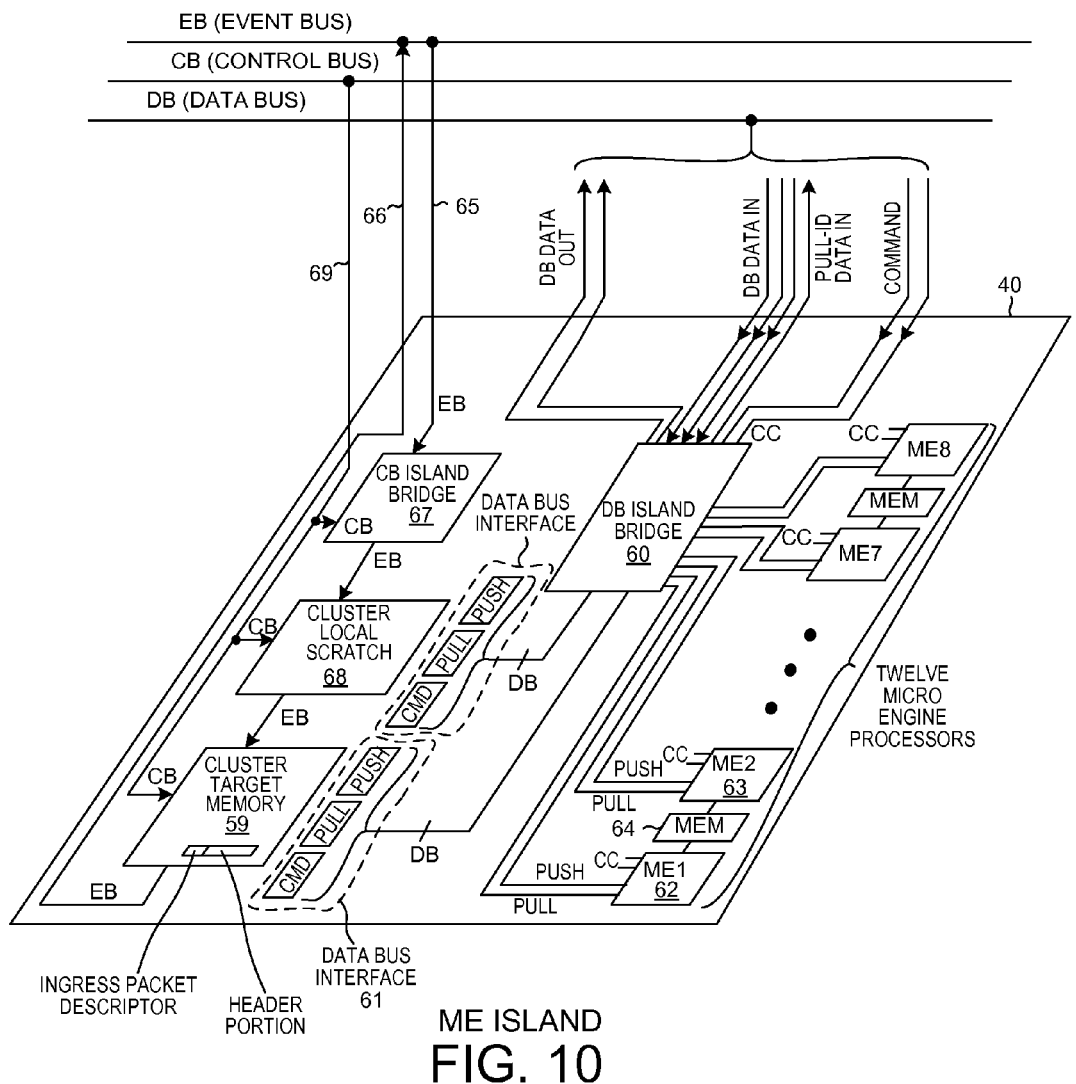
FIG. 10 is a simplified diagram of microengine (ME) island 40 of the IB-NFP integrated circuit of FIG. 2.

ME Island: FIG. 10 is a diagram of the microengine (ME) island 40. In the operational flow of FIG. 2, packet headers and the associated preclassification results are DMA transferred from the ingress NBI island 46 across the configurable mesh data bus and into the Cluster Target Memory (CTM) 59 of ME island 40. A DMA engine in the ingress NBI island 46 is the master and CTM 59 in ME island 40 is the target for this transfer. The packet header portions and the associated ingress packet descriptors pass into the ME island via data bus island bridge 60 and data bus interface circuitry 61. Once in the CTM 59, the header portions are analyzed by one or more microengines. The microengines have, through the DB island bridge 60, a command out interface, a pull-id in interface, a pull-data out interface, and a push data in interface. There are six pairs of microengines, with each pair sharing a memory containing program code for the microengines. Reference numerals 62 and 63 identify the first pair of microengines and reference numeral 64 identifies the shared memory. As a result of analysis and processing, the microengines modify each ingress packet descriptor to be an egress packet descriptor. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is.

Memory errors and other events detected in the ME island are reported via a local event ring and the global event chain back to the ARM island 25. A local event ring is made to snake through the ME island 40 for this purpose. Event packets from the local event chain are received via connections 65 and event packets are supplied out to the local event chain via connections 66. The CB island bridge 67, the cluster local scratch 68, and CTM 59 can be configured and are therefore coupled to the control bus CB via connections 69 so that they can receive configuration information from the control bus CB.

Figure 11:
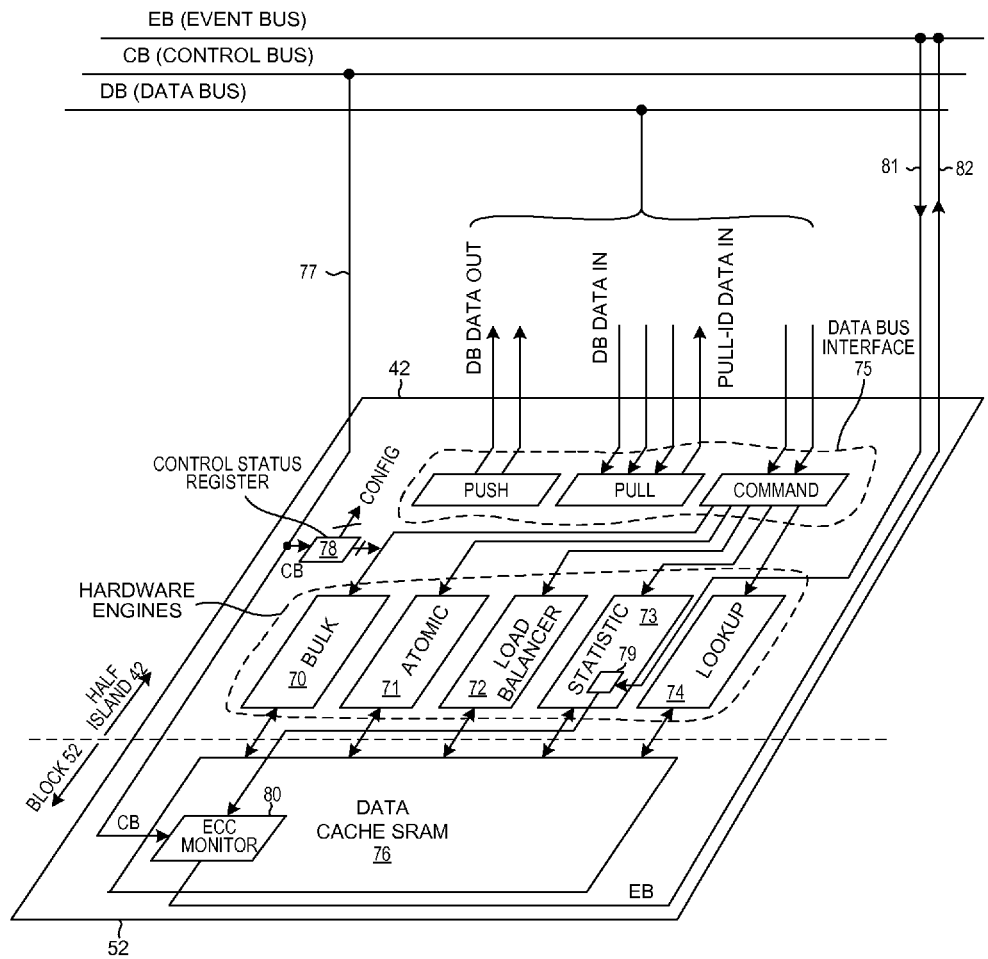
FIG. 11 is a simplified diagram of the memory unit (MU) half island 42 and memory unit (MU) block 52 of the IB-NFP integrated circuit of FIG. 2.
Figure 12:
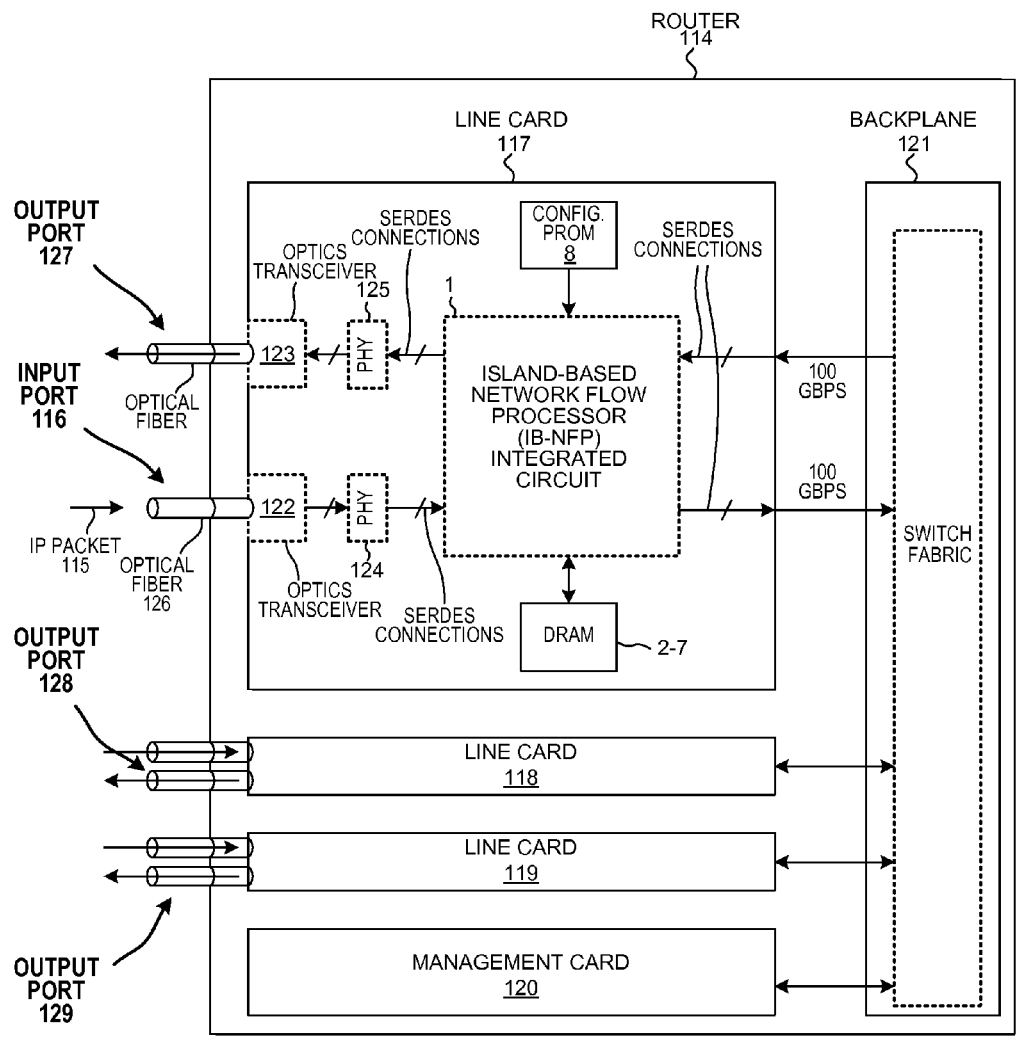
FIG. 12 is a diagram of a network router.

MU Island: FIG. 11 is a diagram of MU half island 42 and SRAM block 52. MU half island 42 includes several hardware engines 70-74. In the operational example, fast path packet payloads are DMA transferred directly from ingress NBI island 46 and across the configurable mesh data bus, through data bus interface 75 of half island 42, and into the data cache SRAM 76 of block 52. The ingress NBI DMA engine issues a bulk write command across the configurable mesh data bus to the bulk transfer engine 70. The destination is the MU island 42. The action is bulk write. The address where the data is to be written into the MU island is the address taken out of the appropriate buffer list. The bulk write command received at the MU is a bulk write, so the data bus interface 75 presents the command to the bulk engine 70. The bulk engine 70 examines the command which is a write. In order to perform a write the bulk engine needs data, so the bulk engine issues a pull-id through the pull portion of interface 75, which in turn issues a pull-id back onto the configurable mesh data bus. The DMA engine in NBI island 46 receives the pull-id. Part of the pull-id is a data reference which indicates to the DMA engine which part of the packet is being requested as data. The DMA engine uses the data reference to read the requested part of the packet, and presents that across the data part of the data bus back to bulk engine 70 in MU island 42. The bulk engine 70 then has the write command and the packet data. The bulk engine 70 ties the two together, and it then writes the packet data into SRAM 76 at the address given in the write command. In this way, fast path packet payload portions pass from DMA engine in the ingress NBI island, across the configurable mesh data bus, through the data bus interface 75, through a bulk transfer engine 70, and into data cache SRAM 76 of block 52. In a similar fashion, exception packet payload portions pass from the DMA engine in ingress NBI island 46, across the configurable mesh data bus, through the data bus interface of half island 44, through the bulk transfer engine of half island 44, and through DDR PHYs 21 and 22, and into external memories 6 and 6.

Various parts of MU island 42 are configurable by changing the contents of registers and memory via the control bus CB and connections 77 and control status registers 78. Errors detected on the MU island by circuits 79 and 80 are reported into a local event ring. Event packets from the local event ring are received via input connections 81 and the MU island outputs event packets to the local even ring via output connections 82.

FIG. 11 illustrates a router utilizing the Island-Based Network Flow Processor (IB-NFP) integrated circuit 1 of FIG. 2. Router 114 receives an IP packet 115 on an input port of the router. The input port is one of many virtual ports of a physical input port 116. Router 114 includes a plurality of line cards 117-119 and a management card 120 that fit into and attach to a backplane 121. The line cards are identical. Line card 117 includes optics transceivers 122 and 123, PHYs 124 and 125, an instance of the Island-Based Network Flow Processor (IB-NFP) integrated circuit 1 of FIG. 2, configuration PROM 8, and DRAM integrated circuits 2-7. The IP packet 115 is communicated through optical fiber 126, through optics transceiver 122, through PHY 124, and to IB-NFP 1. The IB-NFP 1 in this router looks at the IP destination address of the packet and identifies one of several output ports to which the IP packet is to be routed. The IB-NFP then forwards the IP packet so that the IP packet will be output from the router via the determined output port. In the illustrated example, the output port may be one of many virtual output ports of physical output port 127, or may be one of the many virtual output ports of physical output port 128, or may be one of the many virtual output ports of physical output port 129. For additional information on the IB-NFP, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

Figure 13:
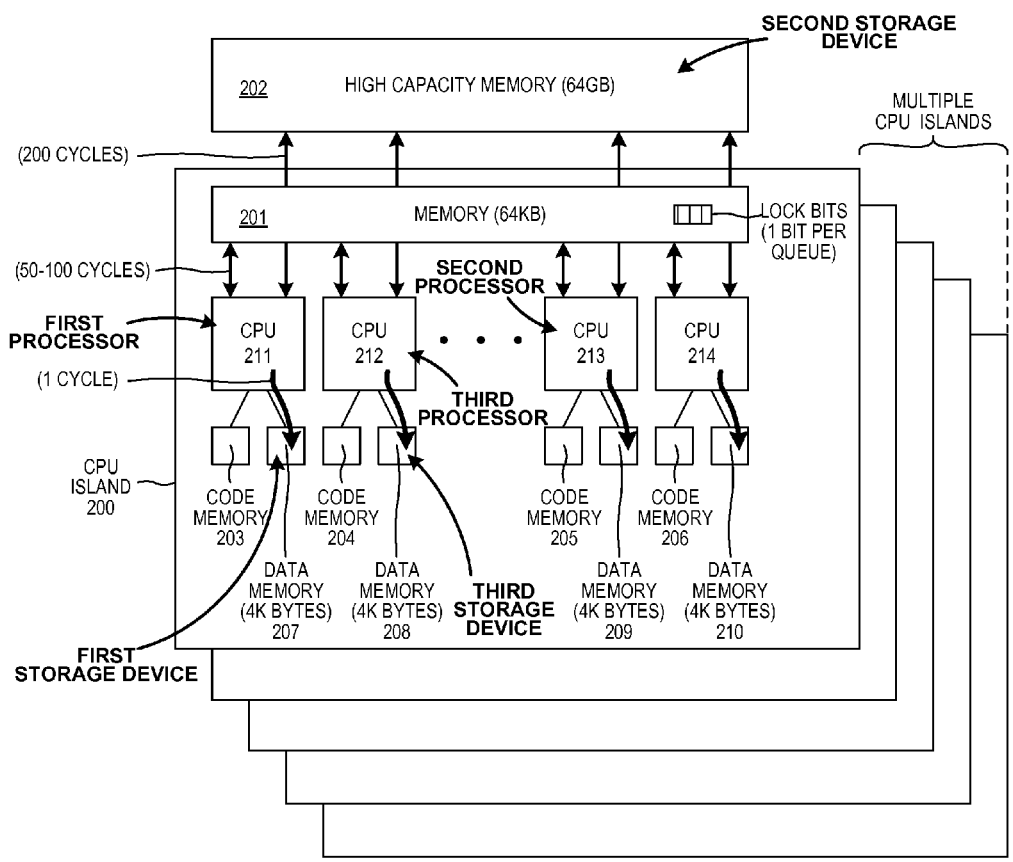
FIG. 13 is a simplified diagram of a network processor having multiple processor islands, each processor island including multiple processors.

FIG. 13 is a simplified diagram of a network processor having multiple processors (CPUs), each processor island including multiple processors. The simplified diagram shown in FIG. 13 is an alternative to the exact microengine structure described above. Processor island 200 includes processors 211-214, code memories 203-206, data memories 207-210, and memory 201. Code memories 203-206 store instructions that are executed by processors 211-214, respectively. Data memories 207-210 store data that is accessed (read/write) by processors 211-214, respectively. Memory 201 is accessible to all processors located on processor island 200. Each processor on all processor islands also has access to high capacity memory 202. In one example, high capacity memory 202 is off chip Dynamic Random Access Memory (DRAM). In one example, high capacity memory 202 is not located on each processor island, but rather is located outside of the network processor. The access time from a processor to its associated code memory is approximately one clock cycle. The access time from a processor to its associated data memory is approximately one clock cycle. The access time from the processor to the memory 201 is approximately fifty to one hundred clock cycles. The access time from the processor to the high capacity memory 202 is approximately two hundred cycles. Given this variance in access time it is desirable to maximize the utilization of data memories 207-210 before utilizing memory 201. Likewise, it is desirable to maximize the utilization of memory 201 before utilizing high capacity memory 202. Therefore, a network traffic management system that maximizes the usage of data memories 207-210 is desired.

Figure 14:
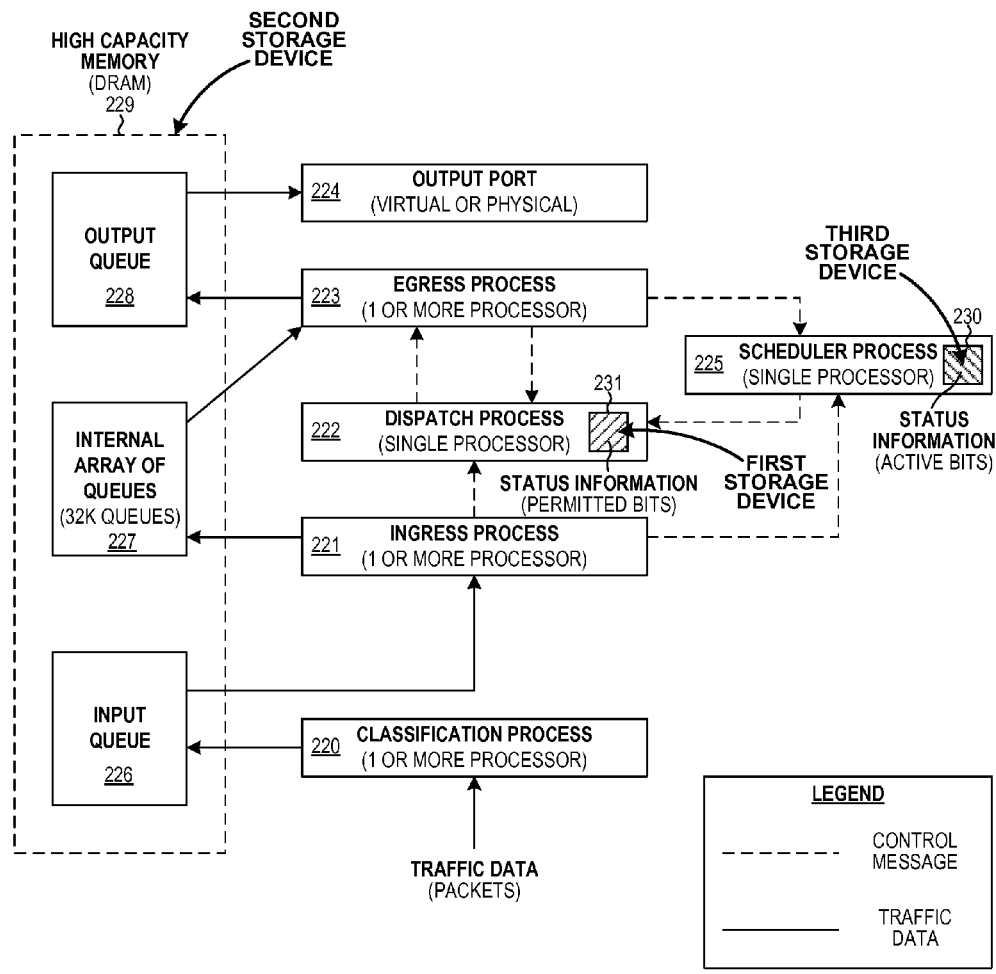
FIG. 14 a diagram illustrating a multi-processor traffic management solution.

FIG. 14 illustrates a multi-processor traffic management solution. The multi-processor traffic management solution includes a classification process 220, an ingress process 221, a dispatch process 222, an egress process 223, and a scheduler process 225. Classification process 220, ingress process 221, and egress process 223 may each be performed by a single processor or by a group of processors. Dispatch process 222 and scheduler process 225 are performed by a single processor. The dispatch process is limited to a single processor because the dispatch process requires rapid access to status information (e.g. permitted bits) stored in data memory 231 which is only accessible by a single processor performing the dispatch process. The scheduler process is limited to a single processor because the scheduler process requires rapid access to status information (e.g. active bits) stored in data memory 230 which is only accessible by a single processor performing the scheduler process. Classification process 220, ingress process 221, and egress process 223 interface with high capacity memory 229. High capacity memory 229 includes an input queue 226, an internal array of queues 227, and an output queue 228. The arrows shown in FIG. 14 illustrate the communication between the various processes and the queue stored in the high capacity memory 229. Arrows attached to a dashed line indicate communication of control message information. Arrows attached to a continuous line indicate communication of traffic data (e.g. a packet including a header and data).

FIG. 15 is a diagram of the internal array of queues 227 shown in FIG. 14. Each queue includes multiple data blocks. The number of queues included in the internal array of queues is variable. In one example, the internal array of queues includes thirty-two thousand queues and each data block is one hundred and twenty-eight bytes wide. FIG. 16 illustrates one example of the contents of a data block. The data block includes a queue head (4 bytes) that is a pointer to the first data block in the queue, a queue tail (4 bytes) that is a pointer to the last data block in the queue, a queue size (4 bytes) that represents the total number of bytes of all data blocks in the queue, a quota (4 bytes) that represents transmission credit value, a weight (2 bytes) that represents the relative rate at which the data is to be sent, additional information such as queue structuring information or statistical counter information, and traffic data (e.g. packing data including payload and header information).

Figures 17, 18:
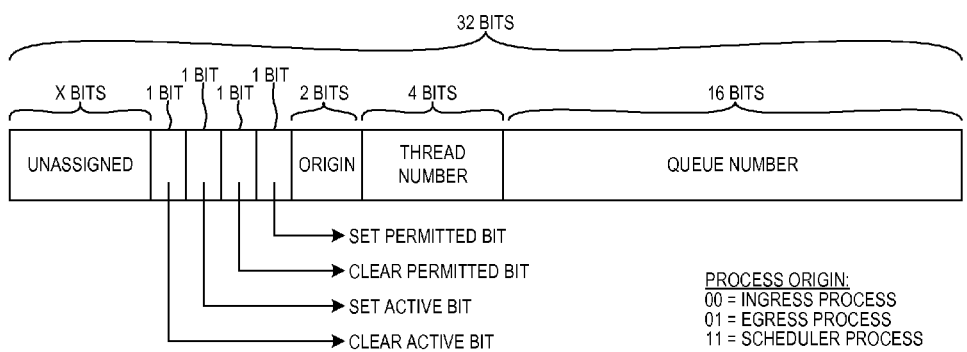
FIG. 17 is a table describing an active bit and a permitted bit.
FIG. 18 is a diagram of an inter-process control message.

FIG. 17 is a table describing the two types of status information (active bits and permitted bits) shown in FIG. 14. An active bit indicates if the associated data block is occupied (1) or empty (0). A permitted bit indicates if the associated data block is permitted to transmit (1) or not permitted to transmit (0).

FIG. 18 illustrates the structure of control messages communicated between various processes. The control message includes a "clear active bit", a "set active bit", a "clear permitted bit", a "set permitted bit", two bits of origin data indicating where the control message originated, four bits representing the thread number of the originating process, and sixteen bits representing the queue number associated with the control message. In one example, origin bits set to "00" indicates that the originating process is the ingress process; origin bits set to "01" indicates that the originating process is the egress process; and origin bits set to "11" indicates that the originating process is the scheduler process.

FIG. 19 illustrates the contents of the data memory 230 associated with the single processor (e.g. micro-engine) performing the scheduler process 225 in FIG. 14. Data memory 230 includes one active bit for each queue included in the internal array of queues 227 shown in FIG. 14. In one example, the internal array of queues 227 includes thirty-two thousand queues, thus requiring that data memory 230 be large enough to store thirty-two thousand active bits. In another example, the internal array of queues 227 includes sixteen thousand queues, thus requiring that data memory 230 be large enough to store sixteen thousand active bits.

FIG. 20 illustrates the contents of the data memory 231 associated with the single processor (e.g. micro-engine) performing the dispatch process 222 in FIG. 14. Data memory 231 includes one permitted bit for each queue included in the internal array of queues 227 shown in FIG. 14. In one example, the internal array of queues 227 includes thirty-two thousand queues, thus requiring that data memory 231 be large enough to store thirty-two thousand permitted bits. In another example, the internal array of queues 227 includes sixteen thousand queues, thus requiring that data memory 231 be large enough to store sixteen thousand permitted bits.

Returning to FIG. 14, incoming traffic data (e.g. a packet) is directed to classification process 220. Classification process 220 performs three tasks: (i) determines the classification associated with the traffic data, (ii) adds the determined classification data to the traffic data, and (iii) writes the combined traffic data and classification data to input queue 226.

Ingress process 221 reads the traffic data from input queue 226 and performs four tasks: (i) determines which of the internal array of queues is to store the traffic data, (ii) creates and sends a control message to dispatch process 222, (iii) creates and sends a control message to scheduler process 225, and (iv) writes the traffic data to the selected queue.

In one example, there is a single pool of packet descriptors which are assigned to queues as appropriate. The packet descriptors are held as a linked list such that the queue header has a pointer to the first (head) data block and to the last (tail) data block. Each packet descriptor (except the last) contains a pointer to the next data block within the queue. To add an additional data block to a queue, the last data block is modified to point to the added data block (which does not contain a pointer to the next data block because it is now the last data block in the queue).

It is desired to have a queue locking system so to prevent contention issues. For example, in a system without queue locking two processes (e.g. threads) could try to update the same queue at the same time. Given that there is only a single queue stored in memory, one process would execute the desired queue manipulation. This would result in the losing process's queue manipulation to not occur. This would cause the system to fail because not all of the instructions issued by the losing process are being completed. To prevent these contention issues, in one example a lock bit is assigned to each queue header. When a process wants to modify a queue, it has to be able to set the lock bit associated with the desired queue. In the even the lock bit associated with the desired queue is already set; the process must wait for the desired queue to be unlocked by another process before issuance of a command to modify the queue.

Figure 22:
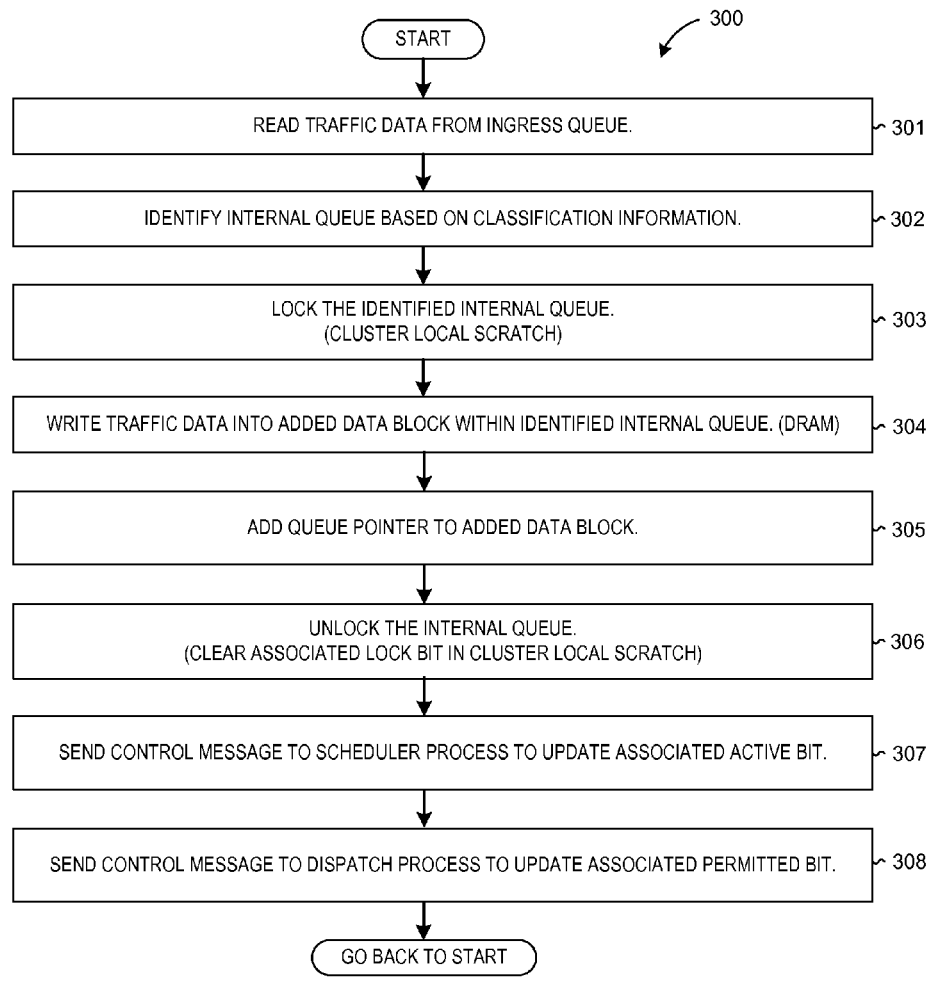
FIG. 22 is a flowchart illustrating the steps performed by an ingress process.

FIG. 22 illustrates the multiple steps performed by the ingress process. In step 301, the ingress process reads traffic data from the ingress queue. In step 302, the ingress process identifies an internal queue based on the classification information added to the traffic data by the classification process. In step 303, the identified internal queue is locked by setting a lock bit located in the local cluster scratch memory associated with the internal queue. In step 304, the traffic data is written into the identified internal queue by adding a data block (containing the traffic data) within the identified queue. In step 305, the locked data block is modified to add a queue pointer as described above. In step 306, the identified internal queue is unlocked by clearing a lock bit located in the local cluster scratch associated with the identified internal queue. In step 307, the ingress process generates and sends a control message to the scheduler process instructing an update of the associated active bit. In step 308, the ingress process generates and sends a control message to the dispatcher process instructing an update of the associated permitted bit.

Figure 23:
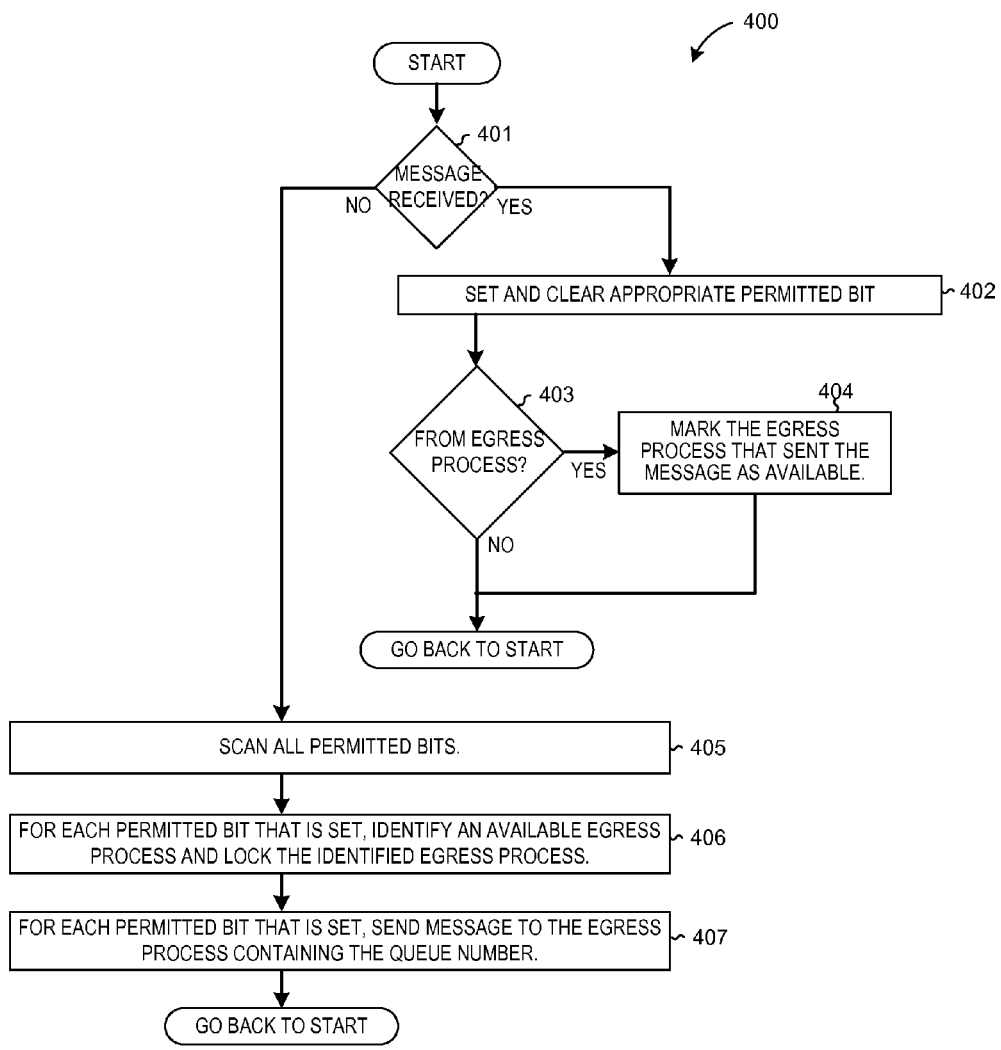
FIG. 23 is a flowchart illustrating the steps performed by a dispatch process.

Dispatch process 222 performs four tasks: (i) reads control message from ingress process 221, (ii) reads control message from egress process 223, (iii) determines available egress processes, and (iv) generates and sends a control message to egress process 223. FIG. 23 illustrates the multiple steps performed by the dispatch process. In step 401, it is determined if a control message has been received. If a control message was not received then the process skips to step 405. If a control message was received then the process continues to step 402. In step 402, the indicated permitted bit is cleared or set depending on the instruction within the control message. In step 403, it determined if the control message was received from the egress process. If the control message was not received from the egress process then the process returns to step 401. If the control message was received from the egress process then the process continues to step 404. In step 404, the dispatch process stores an indicator that the egress process that sent the control message is available. Multiple egress process may be running at a given time. The multiple egress processes may run in separate threads (also referred to as "contexts") on one or more physical processors (e.g. microengines). When the dispatcher process sends a control message regarding an egress process, the dispatcher process stores an indicator that the egress process is busy. The dispatcher process will not send another control message to the egress process until the dispatcher process receives a control message from the egress process that the egress process is no longer busy.

Upon completion of step 404 the process returns to step 401. In step 405 all permitted bits are scanned. In step 406, an available egress process is identified and locked for each permitted bit that is set. In step 407, for each permitted bit that is set a control message is generated and sent to the egress process indicating an associated queue number. Upon completion of step 401, the process returns to step 401.

Figure 24:
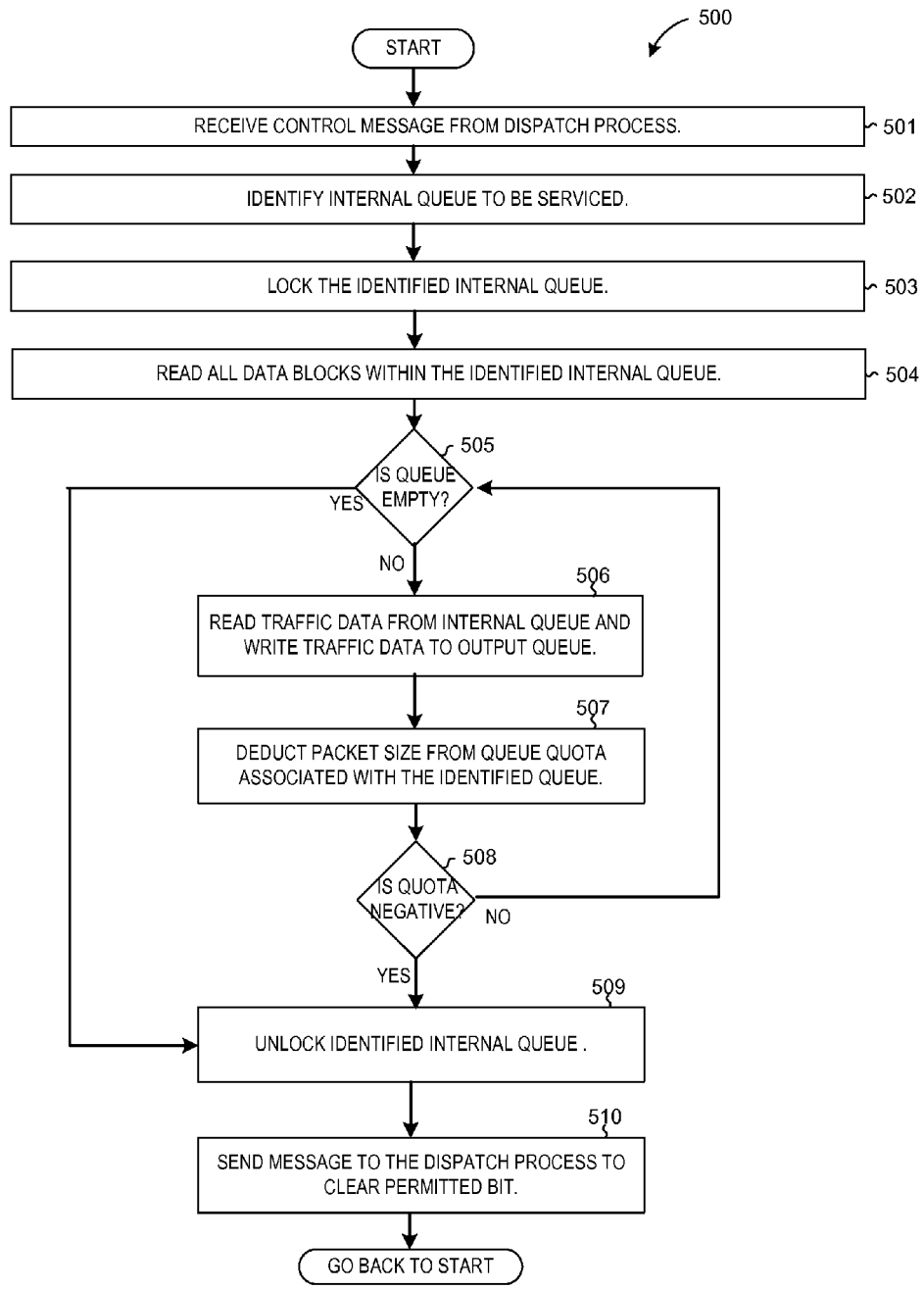
FIG. 24 is a flowchart illustrating the steps performed by an egress process.

Egress process 223 performs five tasks: (i) receives control messages from dispatch process 222, (ii) reads traffic data from internal array of queues 227, (iii) writes traffic data to output queue 228, (vi) generates and sends control messages to dispatch process 222, and (v) generates and sends control messages to scheduler process 225. FIG. 24 illustrates the multiple steps performed by the egress process. In step 501, a control message is received from the dispatch process. In step 502, an internal queue is identified based upon the queue number included in the control message. In step 503, the identified queue is locked by setting the associated lock bits located in the local cluster scratch memory. In step 504, all data blocks within the identified queue are read. In step 505, it is determined if the identified queue is empty. If the identified queue is empty, then the process skips to step 509. If the identified queue is not empty, then the process continues to step 506. In step 506, the traffic data stored in the first data block of the identified queue is read by the egress process and written to output queue 228. In step 507, the size of the traffic data read from the identified queue is deducted from a queue quota associated with the identified queue. In step 508, it is determined if the queue quota is negative. If the queue quota is not negative then the process goes back to step 505. If the queue quota is negative then the process continues to step 509. In step 509, the identified queue is unlocked by clearing the appropriate lock bits in the local cluster scratch memory. In step 510, a control message is generated and sent to the dispatch process instructing the clearing of the permitted bit associated with the identified queue.

Figure 25:
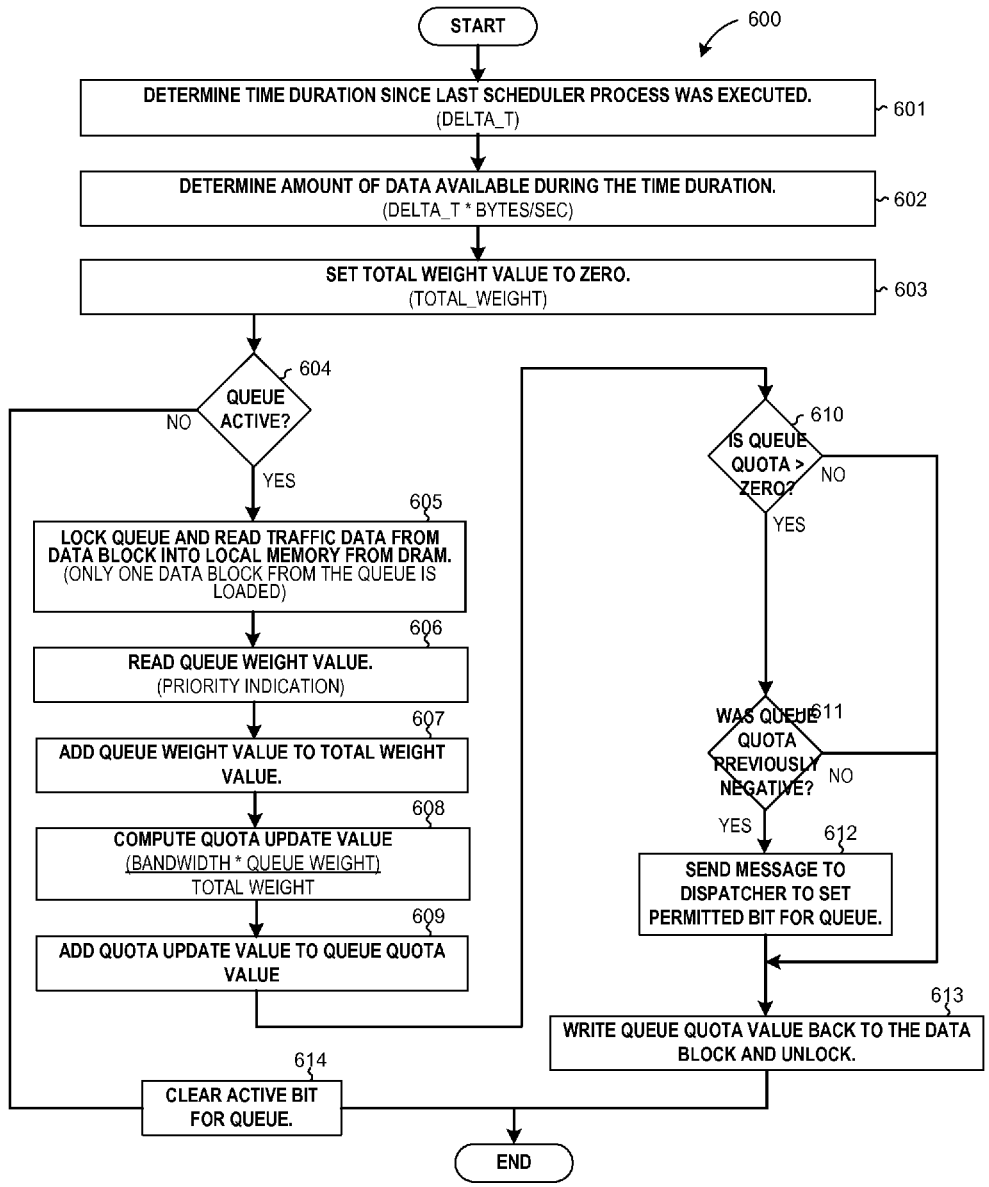
FIG. 25 is a flowchart illustrating the steps performed by a scheduler process.

Scheduler process 225 performs four tasks: (i) receives control messages from ingress process 221, (ii) receives control messages from egress process 223, (iii) generates and send control messages to dispatch process 222, and (iv) manages the bandwidth allocated to each internal queue within the inertial array of queues 227. FIG. 25 illustrates the multiple steps performed by the scheduler process. When the scheduler runs, steps 604 to 613 are executed for all active internal queues.

In step 601, the time duration (delta_T) since the last scheduler process was executed is determined. In step 602, the capacity for data transmission available during the time during is determined by multiplying the time duration since the last scheduler process was executed for the selected queue by the available bandwidth (Delta_T×Bytes/Second). In step 603, the total weight value (Total_Weight) to zero. The total weight value is the sum of all active internal queue weight values. In step 604, it is determined if the queue is active by checking the active bit associated with the selected queue. If it is determined that the selected queue is not active, then the process skips to step 614. In step 614, the active bit associated with the selected queue is cleared and the process returns to step 601. If it is determined that the selected queue is active, then the process continues to step 605. In step 605, the selected queue is locked by setting the associated lock bit in the local cluster scratch memory and traffic data stored in one data block from the selected queue is read into the local cluster scratch memory. In step 606, a queue weight value is read from the traffic data. The weight value is part of the definition of the queue. The weight information is set by the management system when the queue is defined. In step 607, the queue weight value is added to the total weight value. In step 608, a queue update value is calculated by multiplying the available bandwidth by the queue weight value and dividing that result by the total weight value. In step 609, the quota update value is added to the queue quota value. In step 610, it is determined if the queue quota value is greater than zero. If the queue quota value is not greater than zero, then the process skips to step 613. If the queue quota value is greater than zero, then the process continues to step 611. In step 611, it is determined if the queue quota value was previously negative. If not, then the process skips to step 613. If so, then the process continues to step 612. In step 612, a control message is generated and sent to the dispatch process instructing that the permitted bit associated with the selected queue be set. In step 613, the queue quota value is written to the read data block within the selected queue stored in high capacity memory (DRAM) 229 and the selected queue is unlocked. Upon completion of step 613 the process returns to step 601.

Figure 26:
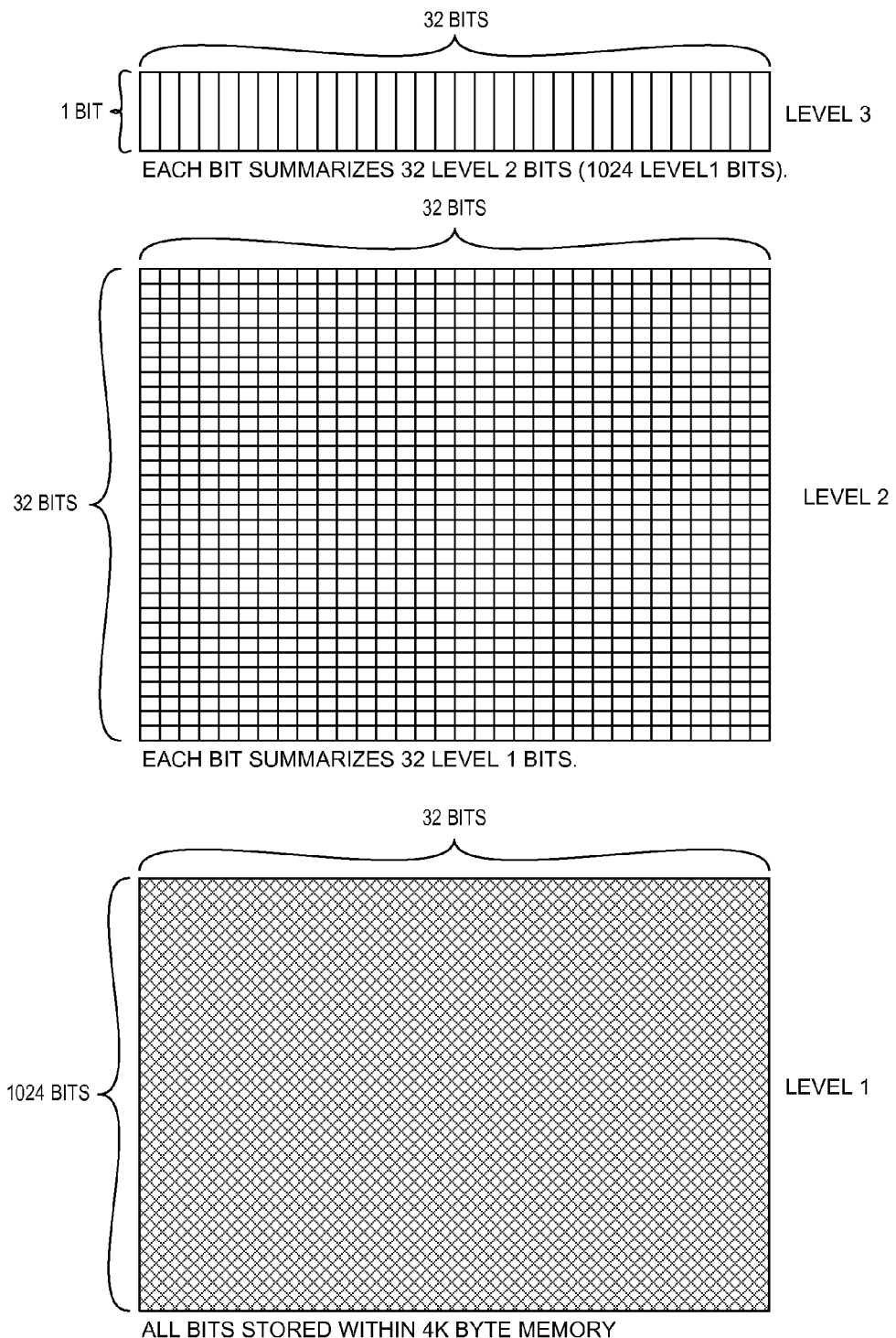
FIG. 26 is a diagram illustrating a fast bit set lookup.

FIG. 26 is a diagram illustrating a fast bit set lookup. Given the high speed demands of today network devices, it is desirable to determine if a memory contains any set bits (logic high) without actually reading each individual bit in memory. FIG. 26 illustrates three levels (level 1, level 2, and level 3). Level 1 is a full four kilobyte memory space. A direct lookup would require that each bit be read to determine if the 4 KB memory space included a set bit. Level 2 is a 32 bit by 32 bit memory space, where each bit summaries 32 level 1 bits. In the event that any of the 32 level 1 bits are set (logic high) then the single level 2 bit will be set (logic high). Alternatively, only when all 32 level 1 bits are not set (logic low) will the single level 2 bit be not set (logic low). Level 3 is a 1 by 32 bit memory space, where each bit summaries 32 level 2 bits and 1024 level 1 bits. In the event that any of the 32 level 2 bits are set (indicating that at least one of the 1024 level 1 bits are set) then the single level 1 bit will be set. Alternatively, only when all 32 level 2 bits are not set (indicating that all 1024 level 1 bits are not set) will the single level 1 bit be not set (logic low). This fast set bit lookup allows micro-engines 211-214 in FIG. 13 to rapidly search for set active bits or permitted bits without having to scan each bit of data memories 207-210), thus reducing the memory access time by reducing the number of reads required to determine if a bit is set in the data memories.

Figure 21:
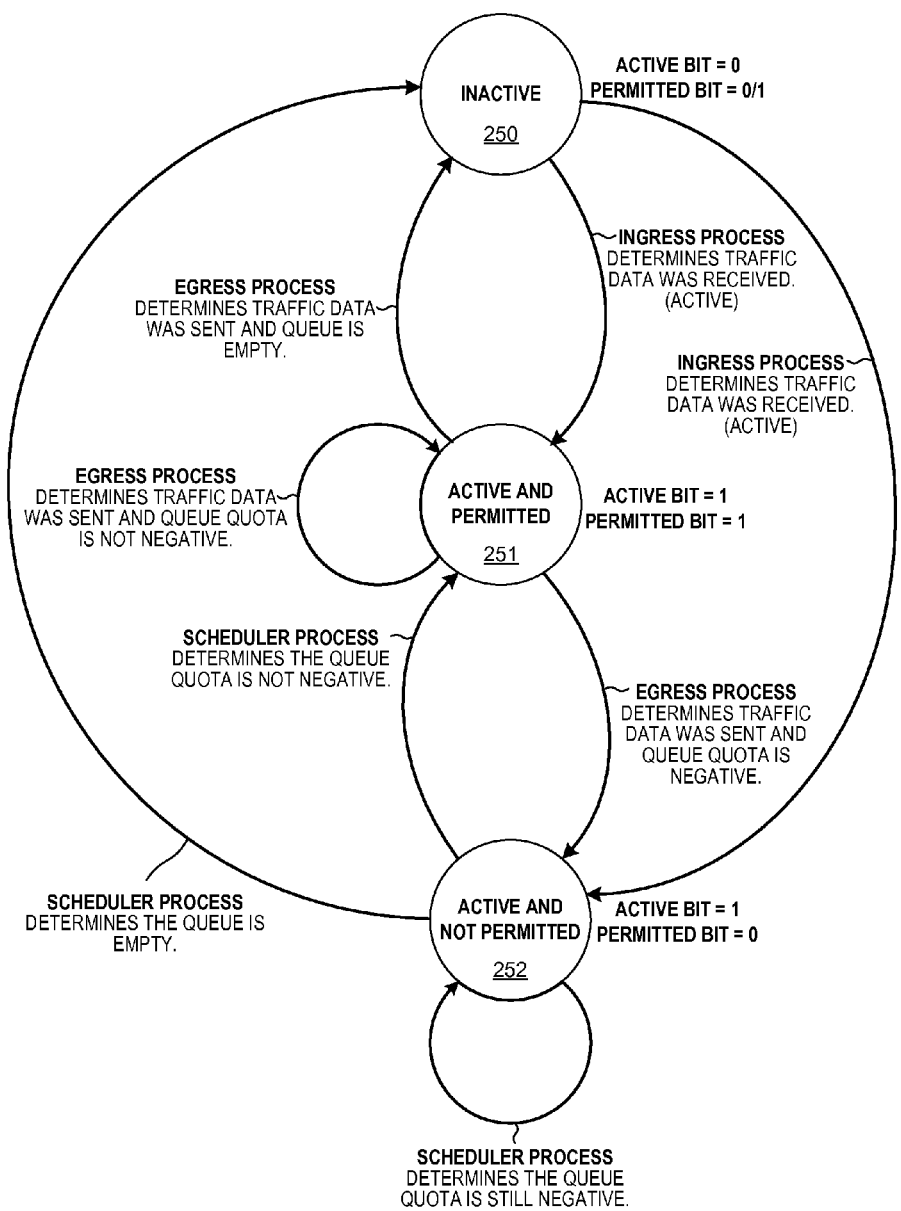
FIG. 21 is a state diagram illustrating the various states of a queue.

FIG. 21 is a state diagram of a queue of data. The state diagram includes three states: inactive state 250, active and permitted state 251, and active and not permitted state 252. In inactive state 250 the active bit associated with the queue is not set ("0") and the permitted bit associated with the queue may be either set ("1") or not set ("0"). The only way to transition from inactive state 250 is for the ingress process to determine that traffic data (e.g. a packet) was received. If traffic data is received and the permitted bit is set ("1"), then the queue transitions to active and permitted state 251. In active and permitted state 251 the traffic data is transmitted and the queue quota is decremented by the amount of traffic data transmitted. If the decremented queue quota is not negative, then the queue will remain at the active and permitted state 251 and continue to transmit traffic data in the queue. When in active and permitted state 251, if the egress process determines that the queue is empty the queue will transition from active and permitted state 251 to inactive state 250. When in active and permitted state 251, if the queue quota becomes negative the queue will transition from active and permitted state 251 to active and not permitted state 252. In active and not permitted state 252 the queue will not transmit any traffic data and will wait for the scheduler process to replenish its queue quota to a positive value. Once the queue quota is a positive value, the permitted bit will be set ("1" and the queue will return to the active and permitted state 251. In the event that the queue is emptied, then the queues active bit will be cleared ("0") and the queue will return to inactive state 250. In the event that the queue is inactive state 250 and traffic data is received and the permitted bit associated with the queue is not set ("0"), then the queue will transition to the active and not permitted state 252. The queue will remain in this state until the scheduler process determines the queue quota is not longer negative and the permitted bit is set ("1"), at which point the queue will transition to active and permitted state 251.

Figure 27:
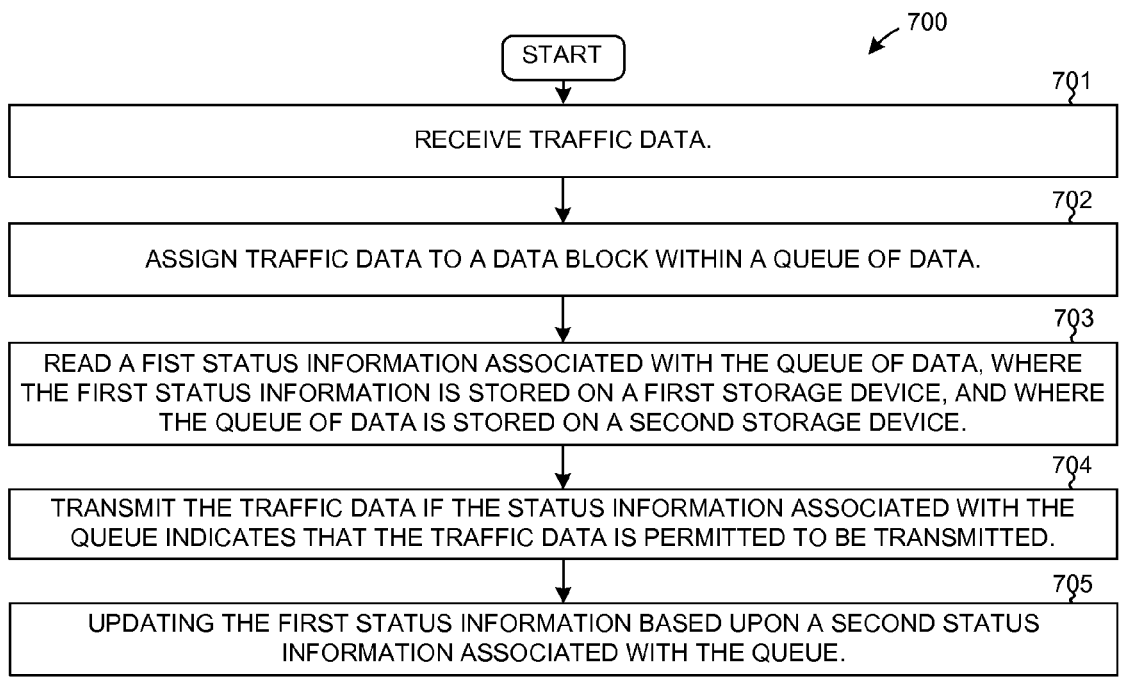
FIG. 27 is a flowchart of a novel method of performing an efficient complex network traffic management in a non-uniform memory system.

FIG. 27 is a flowchart of an improved traffic management process. In step 701, traffic data is received. In step 702, traffic data is assigned to a data block within a queue of data. In step 703, status information associated with the queue of data is read, wherein the first status information is stored on a first storage device, and wherein the queue of data is stored on a second storage device. In step 704, the traffic data is transmitted if the status information associated with the queue of data indicates that the traffic data is permitted to be transmitted. In step 705, the first status information is updated based upon a second status information associated with the queue of data, wherein the updating of is performed by a third processor that communicates with the first and second processors, and wherein the second status information is stored in a third storage device.

The embodiments described above disclose efficient complex network traffic management in a non-uniform memory system. The use of multiple processors to simultaneously perform various network traffic management processes provides the ability to produce networking devices that can perform at speeds up to 100 GHz and above.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method, comprising:
   (a) receiving traffic data;
   (b) storing the traffic data in a data block within a queue of data;
   (c) reading a first status information associated with the queue of data, wherein the first status information is stored on a first storage device, and wherein the queue of data is stored on a second storage device; and
   (d) transmitting the traffic data if the status information associated with the queue of data indicates that the traffic data is permitted to be transmitted, wherein steps (a) and (b) are performed by a first processor, wherein step (c) is performed by a second processor, wherein step (d) is performed by a third processor, and wherein the first, second, and third processor are collocated on a single processor island.

2. The method of claim 1, further comprising;
   (b1) updating a second status information upon receiving the traffic data, wherein the second status information is a bit indicating if the queue of data contains traffic data, and wherein the second status information is stored in a third storage device.

3. The method of claim 1, wherein the first status information is a single bit indicating that the traffic data in the queue of data is permitted to be transmitted.

4. The method of claim 1, wherein the first storage device has a first access rate, wherein the second storage device has a second access rate, and wherein the first access rate is greater than the second access rate.

5. The method of claim 2 further comprising:
   (e) updating the first status information based upon a second status information associated with the queue of data, wherein the updating of (e) is performed by a fourth processor that communicates a control message to the second processor, and wherein the second status information is stored in the third storage device.

6. The method of claim 2, wherein the second storage information is a bit indicating if the queue of data contains traffic data.

7. The method of claim 1, wherein the reading of (c) is performed by performing a fast bit set lookup.

8. The method of claim 1, wherein the reading of (c) further comprises:
   (c1) scanning a first set of bits, wherein each of the first set of bits indicates if any one of a second set of bits is set, and wherein each of the second set of bits indicates if any one of a third set of bits is set.

9. The method of claim 1, wherein the first storage device and the third storage device are located on the processor island, and wherein the second storage device is not located on the processor island.

10. The method of claim 1, wherein the receiving of (a) is performed across a Command/Push/Pull (CPP) bus.

11. The method of claim 1, wherein the transmitting of (d) is performed in part across a Command/Push/Pull (CPP) bus.

12. The method of claim 1, wherein the first processor has a dedicated code memory and a dedicated data memory, and wherein the dedicate code memory and dedicated data memory are both located on the processor island.

13. The method of claim 1, wherein the first and second storage devices are taken from the group consisting of: a register, a plurality of registers, a memory, a plurality of memories.

\* \* \* \* \*